US011614068B2

(12) United States Patent
Corten

(10) Patent No.: US 11,614,068 B2
(45) Date of Patent: Mar. 28, 2023

(54) AIRFOIL WITH A VORTEX GENERATOR PAIR

(71) Applicant: Wobben Properties GmbH, Aurich (DE)

(72) Inventor: Gustave Paul Corten, BH Alkmaar (NL)

(73) Assignee: Wobben Properties GmbH, Aurich (DE)

(*) Notice: Subject to any disclaimer, the term of this patent is extended or adjusted under 35 U.S.C. 154(b) by 0 days.

(21) Appl. No.: 16/558,729

(22) Filed: Sep. 3, 2019

(65) Prior Publication Data

US 2020/0018285 A1 Jan. 16, 2020

Related U.S. Application Data

(63) Continuation of application No. 14/916,040, filed as application No. PCT/NL2014/000028 on Sep. 1, 2014, now Pat. No. 10,443,562.

(30) Foreign Application Priority Data

Sep. 2, 2013 (NL) ..................................... 1040365

(51) Int. Cl.
*F03D 1/06* (2006.01)
*B64C 23/06* (2006.01)
*F03D 3/06* (2006.01)

(52) U.S. Cl.
CPC ............ *F03D 1/0675* (2013.01); *B64C 23/06* (2013.01); *F03D 3/062* (2013.01);
(Continued)

(58) Field of Classification Search
CPC .... F03D 1/0675; F03D 1/0633; F03D 1/0641; B64C 23/06; Y02E 10/721; F05B 2240/122; F05B 2240/3062
See application file for complete search history.

(56) References Cited

U.S. PATENT DOCUMENTS 2,650,315 A 8/1953 Karsten et al.
2,650,752 A 9/1953 Hoadley et al.
(Continued)

FOREIGN PATENT DOCUMENTS

CN 101223356 A 7/2008
CN 101324218 A 12/2008
(Continued)

OTHER PUBLICATIONS

Chinese Office Action for Application No. CN201480048464.8, dated Jan. 23, 2019, 8 pages.
(Continued)

*Primary Examiner* — Woody A Lee, Jr.
*Assistant Examiner* — Behnoush Haghighian
(74) *Attorney, Agent, or Firm* — Brooks Kushman P.C.

(57) ABSTRACT

A wind turbine includes a blade having a leading edge, a trailing edge, and opposing first and second surfaces extending between the edges. A vortex generator pair includes a base attached to the first surface and first and second spaced apart fins extending outwardly from opposing portions of the base. The fins each have a leading edge, a trailing edge, a suction side and a pressure side. Each of the suction sides have a trailing half and a leading half.

13 Claims, 5 Drawing Sheets

(52) U.S. Cl.
CPC ........ B64C 2230/26 (2013.01); F03D 1/0633 (2013.01); F03D 1/0641 (2013.01); F05B 2240/122 (2013.01); F05B 2240/30 (2013.01); Y02E 10/72 (2013.01); Y02T 50/10 (2013.01)

(56) References Cited

U.S. PATENT DOCUMENTS

| | | | |
|---|---|---|---|
| 2,740,596 A | 4/1956 | Lee et al. | |
| 3,578,264 A * | 5/1971 | Kuethe | F28F 1/32 244/200.1 |
| 3,741,285 A * | 6/1973 | Kuethe | F28F 13/12 165/181 |
| 4,128,363 A * | 12/1978 | Fujikake | F04D 19/002 416/236 A |
| 5,058,837 A * | 10/1991 | Wheeler | B64C 23/06 244/200.1 |
| 6,503,058 B1 * | 1/2003 | Selig | F03D 1/0641 416/223 R |
| 6,837,465 B2 * | 1/2005 | Lisy | B64C 23/06 244/204.1 |
| 7,585,157 B2 | 9/2009 | Quell et al. | |
| 7,604,461 B2 | 10/2009 | Bonnet | |
| 7,857,597 B2 * | 12/2010 | Anjuri | F03D 1/06 416/236 R |
| 7,927,070 B2 | 4/2011 | Godsk et al. | |
| 7,961,462 B2 * | 6/2011 | Hernon | F28F 13/12 361/694 |
| 8,038,396 B2 * | 10/2011 | Anjuri | F03D 1/0641 416/1 |
| 8,047,801 B2 * | 11/2011 | Fang | F03D 1/0683 416/235 |
| 8,157,532 B2 * | 4/2012 | Matesanz Gil | F03D 1/0608 416/235 |
| 8,167,554 B2 * | 5/2012 | Wang | F03D 1/0675 416/23 |
| 8,210,482 B2 * | 7/2012 | Miller | B64C 23/06 244/200.1 |
| 8,544,799 B2 * | 10/2013 | Da Silva | B64D 33/00 244/130 |
| 8,656,957 B2 * | 2/2014 | Babinsky | F15C 1/16 137/809 |
| 8,746,053 B2 * | 6/2014 | Brake | F03D 1/0608 73/147 |
| 8,757,701 B2 * | 6/2014 | Guigne | B62D 35/001 296/180.3 |
| 8,870,124 B2 * | 10/2014 | Ireland | B64C 23/065 244/200.1 |
| 9,039,381 B2 * | 5/2015 | Grife | F03D 1/0675 416/236 R |
| 9,057,359 B2 * | 6/2015 | Fuglsang | F03D 1/0675 |
| 9,133,816 B2 * | 9/2015 | Jensen | F03D 1/0675 |
| 9,494,132 B2 * | 11/2016 | Riddell | F03D 13/10 |
| 9,556,849 B2 * | 1/2017 | Riddell | F03D 1/0633 |
| 9,562,513 B2 * | 2/2017 | Tobin | F03D 1/0675 |
| 9,682,735 B2 * | 6/2017 | Bacon | B62D 35/001 |
| 9,777,703 B2 * | 10/2017 | Madsen | F03D 1/0658 |
| 9,829,215 B2 * | 11/2017 | Olalde | F24S 20/20 |
| 10,584,676 B2 * | 3/2020 | Tobin | F03D 1/0675 |
| 10,974,818 B2 * | 4/2021 | Wurth | F03D 1/0633 |
| 2006/0280614 A1 | 12/2006 | Quell et al. | |
| 2008/0206055 A1 | 8/2008 | Godsk et al. | |
| 2009/0074574 A1 | 3/2009 | Godsk et al. | |
| 2009/0123289 A1 * | 5/2009 | Tangier | F01D 5/141 416/223 R |
| 2010/0209258 A1 * | 8/2010 | Fuglsang | F03D 1/0633 416/90 R |
| 2011/0008174 A1 * | 1/2011 | Ireland | B64C 23/06 416/223 R |
| 2011/0095135 A1 * | 4/2011 | Miller | B64C 23/06 244/200.1 |
| 2011/0142664 A1 | 6/2011 | Anjuri et al. | |
| 2011/0142673 A1 | 6/2011 | Fang et al. | |
| 2012/0070281 A1 * | 3/2012 | Fuglsang | F03D 7/0224 416/1 |
| 2012/0151769 A1 * | 6/2012 | Brake | F03D 1/0608 29/889.71 |
| 2012/0257977 A1 * | 10/2012 | Jensen | F03D 1/0608 416/223 R |
| 2013/0280073 A1 * | 10/2013 | Erichsen | F03D 1/0675 416/146 R |
| 2014/0140856 A1 * | 5/2014 | Madsen | F03D 7/0232 416/236 R |
| 2014/0219810 A1 * | 8/2014 | Wurth | B64C 23/06 416/235 |
| 2014/0328687 A1 * | 11/2014 | Tobin | F03D 1/0633 416/174 |
| 2014/0374566 A1 * | 12/2014 | Fernando | B64D 29/04 248/554 |
| 2015/0010407 A1 * | 1/2015 | Zamora Rodriguez | F03D 1/0641 416/236 R |
| 2015/0176564 A1 * | 6/2015 | Kumar | F03D 1/0675 416/236 R |
| 2015/0361952 A1 * | 12/2015 | Petsche | F03D 1/0633 416/223 A |
| 2016/0138563 A1 * | 5/2016 | Altmikus | F03D 1/0675 416/223 A |
| 2016/0305250 A1 * | 10/2016 | Diez-Garias | F03B 17/061 |
| 2017/0107969 A1 * | 4/2017 | Tobin | F03D 1/0675 |
| 2017/0363061 A1 * | 12/2017 | Madsen | F03D 1/0608 |

FOREIGN PATENT DOCUMENTS

| | | |
|---|---|---|
| CN | 102297097 A | 12/2011 |
| CN | 102536632 A | 7/2012 |
| DE | 102009037746 A1 | 2/2011 |
| EP | 2031243 A1 | 3/2009 |
| EP | 2466122 A2 | 6/2012 |
| EP | 2484896 A1 | 8/2012 |
| EP | 2484897 A1 | 8/2012 |
| EP | 2484898 A1 | 8/2012 |
| EP | 2548800 A1 | 1/2013 |
| EP | 2801720 A1 | 12/2014 |
| EP | 3042073 B1 | 7/2016 |
| EP | 3597902 A1 | 1/2020 |
| NL | 1040365 | 9/2013 |
| NL | 2014000028 | 9/2014 |
| WO | 9011929 A1 | 10/1990 |
| WO | 0015961 A1 | 3/2000 |
| WO | 2005035978 A1 | 4/2005 |
| WO | 2006122547 A1 | 11/2006 |
| WO | 201120818 A1 | 2/2011 |
| WO | 2012082324 A1 | 6/2012 |
| WO | 2013014080 A2 | 1/2013 |
| WO | 2013014082 A2 | 1/2013 |
| WO | 2015030573 A1 | 3/2015 |
| WO | 2007140771 A1 | 12/2017 |

OTHER PUBLICATIONS

International Search Report for PCT/NL/2014/000028, Completed by the European Patent Office on Dec. 5, 2014, 3 pages.

Mueller-Vahl, Hanns, et al. "Vortex generators for wind turbine blades: A combined wind tunnel and wind turbine parametric study." Turbo Expo: Power for Land, Sea, and Air. vol. 44724. American Society of Mechanical Engineers, 2012.

Pcurran, "Wind Turbine Performance Boosting With Custom Vortex Generator Solution", Webinar, Jun. 19, 2013, 6 pages.

"www.windpowerengineering.com", Screenshot of Website, Aug. 3, 2013, 1 page.

Serakawi, A. R., and K. A. Ahmad. "Experimental study of half-delta wing vortex generator for flow separation control." Journal of aircraft 49.1 (2012): 76-81.

Miller, G. E. "Comparative performance tests on the Mod-2, 2.5-MW wind turbine with and without vortex generators" (1995).

Velte, Clara Marika, et al. "Evaluation of the performance of vortex generators on the du 91-w2-250 profile using stereoscopic piv." Journal of Systemics, Cybernetics and Informatics 2. 2009.

(56) References Cited

OTHER PUBLICATIONS

Velte, Clara Marika, et al. "Vortex generator induced flow in a high re boundary layer." Journal of Physics: Conference Series. vol. 555. No 1. IOP Publishing, 2014.

Zhou, Guobing, and Qiuling Ye. "Experimental investigations of thermal and flow characteristics of curved trapezoidal winglet type vortex generators." Applied Thermal Engineering 37 (2012): 241-248.

Fernández Gámiz, Unai. "Fluid dynamic characterization of vortex generators and two-dimensional turbulent wakes." (2013).

D. Rutter, "Fins! Fins, Everywhere!" Webpage, http://www.howtospotapsychopath.com/2012/09/15/fins-fins-everywhere/. (2012), 6 pages.

Wayback machine showing crawled web page, http://web.archive.org/web/2016*/http://www.howtospotapsychopath.com/2012/15/fins-fins-everywhere/. Sep. 18, 2012, 3 pages.

V-spoilers sold from AirFlow Detector, Webpage, https://airflowdetector.com/home/vspoiler/. 6 pages.

Lin, John C. "Review of research on low-profile vortex generators to control boundary-layer separation." Progress in Aerospace Sciences 38.4-5 (2002): 389-420.

Wetzel, Kyle K., and Saeed Farokhi. "Influence of Vortex Generators on NREL S807 Airfoil Aerodynamic Characteristics and Wind Turbine Performance." Wind Engineering (1995): 157-165.

* cited by examiner

AIRFOIL WITH A VORTEX GENERATOR PAIR

CROSS-REFERENCE TO RELATED APPLICATIONS

This application is a continuation application of U.S. patent application Ser. No. 14/916,040 filed Mar. 2, 2016, now U.S. Ser. No. 10/443,562, issued Oct. 15, 2019, which is the U.S. national phase of PCT Application No. PCT/NL2014/000028 filed on Sep. 1, 2014, which claims priority to NL Patent Application No. 1040365 filed on Sep. 2, 2013, the disclosures of which are incorporated in their entirety by reference herein.

TECHNICAL FIELD

The invention is related to airfoils of wind turbines, planes or helicopters, meant for the generation of aerodynamic lift.

BACKGROUND

Both wind turbines, planes and helicopters are using airfoils which need to have a high lift coefficient and good lift/drag performance. It is state of the art to apply vortex generators to existing airfoils since it is known that this will increase the maximum lift coefficient. However even after much research efforts, the use of vortex generators has not shown a breakthrough development since it is associated with the following problems.

The performance of an airfoil can be expressed by the lift coefficient and the lift over drag ratio. The precise required values depend on the technical application of the airfoil, however in general, when the application of vortex generators is considered, the designer has an airfoil without vortex generators which performs well up to a certain angle of attack (aNvG), and wants to extend the good performance range beyond aNVG by using vortex generators. This can be realized with classical vortex generators, however, for angle of attack below aNVG, the lift over drag ratio decreases substantially. This is usually not acceptable. For example in WO90/11929 by Wheeler a large number of geometries is proposed. This publication does not disclose which geometry would give acceptable performance. It was shown that the geometries revealed by Wheeler in FIGS. 1 and 2 and 4 did not provide airfoil performance which was better than that of airfoils without vortex generators. Also WO00/15961 discloses several geometries which are shown not to give acceptable performance.

A second problem is that the attachment of vortex generators often fails. Vortex generators usually exist of baseplates with one or more fins which are glued on the airfoil surface. In the practice of wind turbines the vortex generators come loose within weeks or a few years. It was tried to increase the size of the base so that the attachment area was increased. This idea did not give better fixation. For example in EP 2031243A1 by LM a radical solution was proposed by submerging vortex generators in the airfoil surface. However it should be noted that airfoil have to pass through high bending moments, which means that the surface experiences high stress and thus that a discontinuity in the surface such as is proposed by LM is unacceptable. Another attempt was to produce strips with multiple vortex generator pairs so that many vg-fins could be applied quickly and the full strip surface was fixed by adhesive. Strips of plastic and of aluminium have been applied on many rotor blades but came loose within a few weeks—years. Also the fixation of the strips with high quality silicone based adhesive did not improve the situation.

A third problem is that the vortex generator should be resistant to all possible weather conditions, which also sets shape demands. For example a thickness of 2-5 mm or more in particular 3-4 mm is required for standard plastics to have long term UV-resistance. Such thickness cause the vortex generator to become stiff so that it cannot adapt to the shape of the airfoil surface. Furthermore such thickness for the baseplate of the vortex generator means that the flow has to step up and step down the baseplate over at least the 2-5 mm and it means that the vortex generator fins need to be relatively thick which all leads to poor aerodynamic performance. Another attempt to solve this problem was to place the vg-strips in a recess in the blade surface. The aim was to reduce the aerodynamic drag caused by the strips when place on top of the surface. In practice, however, it was not feasible to produce the recess and the vg-strips so accurately that, the blade surface was smooth with the vg-strips positioned in the recess. Furthermore, these vgs did come loose quickly and the recess in the blade surface reduced building height and caused cracks in the surface.

A fourth problem is that the vortex generator should be easily applicable and should be shaped such that objects would not become stuck by the vortex generator fins and should not be intrusive in the airfoil. In the practice of wind energy often triangular shaped vortex generator fins are applied since this shape is proven to generate strong vortices, however, the sharp edges could injure service personnel and obstruct hoisting belts. It is clear that this problem also sets demands on the shape so that it becomes even more difficult to obtain an aerodynamically optimized shape. It is known from fundamental theoretical analysis and not doubted that strong vortices are generated when a bound aerodynamic circulation suddenly stops. This is why the sharp-edge triangular form and also a sharp-edge rectangular form cannot be avoided when strong concentrated vortices are required. So the expert in the art has not much room to solve the problems.

In the light of the above problems, it needs explanation why vortex generators are often applied to stall regulated wind turbines. The reason is that many stall regulated turbines suffered from large underperformance and that the application of vortex generators could solve this to a large extent. However the solution was not durable since the vortex generators came loose. Therefore, designers of wind turbines put effort in new blade and airfoil designs which did not require vortex generators. This design method was rather successful and therefore wind turbines typically do not have vortex generators.

SUMMARY

The aim of the invention is to overcome the above-mentioned disadvantages.

According to one embodiment, the invention is an airfoil of chord c with a thickness of more than 20% c and in particular of more than 25% c comprising a vortex generator pair between chordwise position 20% c and 70% c, the vortex generator pair comprising two not directly connected fins and a base that interconnects said fins. The base may cover less than 90 percent of the area between the fins. The fins are placed under opposite angles of attack, characterized in that the fins are cambered by at least 1% in particular by at least 2% and more particularly by a least 3% of the fin chord. The camber of the fins resulted in better aerodynamic performance and gave stiffness to the fins at the same time. The fins could be made very thin without becoming too flexible due to the camber. And thinner fins require less material. Furthermore, thanks to the camber of the fins, the baseplate becomes flexible and can follow a range of curvatures of the airfoil surface where the vortex generator pair is attached. In case of uncambered fins, the baseplate becomes very stiff and has only one fixed curvature. Conclusively, the camber of the fins also improves the attachment of the vortex generator pair to the surface. Amazingly, the addition of camber to the fins leads to four main advantages: better aerodynamics, better fixation, high stiffness of the fins and low material use. The airfoil may include multiple vortex generator pairs arranged on the airfoil such that the distance measured half way the fin chord between the suction sides of adjacent fins of different vortex generator pairs is at least 120% of the distance between the pressure sides of adjacent fins of a vortex generator pair. In other embodiments, the distance measured half way the fin chord between the suction sides of adjacent fins of different vortex generator pairs is at least 150% of the distance between the pressure sides of adjacent fins of a vortex generator pair.

According to an embodiment of the invention, the airfoil is suitable for planes and helicopters, including airfoils of less than 20% c thickness when the vortex generator pair is attached between 20% c and 50% c.

A breakthrough thought was that the classical idea that a vortex generator should generate concentrated strong vortices turned out to be incorrect. Instead, it was found that non-concentrated vorticity is even more effective and thus that fins which have a rounded trailing edge lead to better airfoil performance. The vortex generator is effective by mixing high-speed air from outside the boundary layer with low-speed air inside the boundary layer (this is known) and by transporting low-speed air from inside the boundary layer to outside the boundary layer (this is new). This second effect is stronger when vorticity is not concentrated but rather distributed and when vortex generator pairs are applied of which the fins generate opposite vorticity.

Therefore, according to an embodiment of the invention, the lateral area of the trailing half of the fins of the vortex generator is less than 45% and in particular less than 40% of the product of the fin chord and the fin height.

An amazing conclusion was that the thought that the fixation problem of the vgs could be solved by enlarging the base was wrong and that instead the fixation improved by reducing the base plate and choosing a shape which allows thermal expansion.

A beneficial embodiment of the invention is base shaped like a 'U', a 'V' or a 'W' and that the base is essentially not extending beyond the area between the fins. Those shapes also lead to better aerodynamic performance. More benefit is obtained when the base comprises two subfins that are smaller than the main fins and are located between the main fins. The height of the subfins is typically between 5% and 30% of the main fins.

More benefit is obtained when the distance measured halfway the fin chord between the suction sides of adjacent main fins of different vortex generator pairs is at least 120% and preferably about 150% of the distance between pressure sides of adjacent main fins of a vortex generator pair.

According to a beneficial embodiment of the invention, the largest length in lateral direction in solid base material is less than 100% in particular less than 90% and more in particular less than 70% of the bottom fin chord.

According to another beneficial embodiment of the invention, the edge length of the base has an angle with the design inflow direction between 50 and 0 degrees over more than 70%, in particular more than 80%, and more in particular 90% of its length.

According to another beneficial embodiment of the invention, the base is fixed to the airfoil surface by double-sided adhesive tape with a thickness of at least 0.3%, for example at least 0.5% and for example about 1% of the largest length in solid baseplate material.

According to another beneficial embodiment of the invention, the vortex generator pair and the airfoil surface form a solid body without voids or air inclusions.

According to another beneficial embodiment of the invention, the height of the main fins is between 2% c and 6% c.

According to another beneficial embodiment of the invention, the airfoil thickness can be less than 20% c thickness in case it should be robust for surface contamination.

According to a further beneficial embodiment of the invention, the airfoil comprises a vortex generator pair and two fins, characterized in that the lateral area of the trailing 50% of said fins is less than 200% and preferably less than 150% of the lateral area of the leading 50% of said fins.

A car roof top container should have a shape which provides a large volume, which has the drawback that the container adds much aerodynamic drag to a car and therefore increases fuel consumption. This problem can be solved by the application of vortex generators to the container according to any of the following embodiments:

1. Car roof top container characterized in that it comprises vortex generators and that its lateral cross section at 95% length is less than 60% of its maximum lateral cross section.
2. Car roof top container according to embodiment 1 characterized in that the lateral cross section at 95% length is less than 50%, in particular less than 40% and more in particular less than 30% of the maximum lateral cross section.
3. Car roof top container according to embodiment 1 or 2 characterized in that the vortex generators are located in the length range between 40% L and 90% L.
4. Car roof top container according to embodiment 1 or 2 characterized in that the vortex generators are located near the length position of maximum lateral cross section or not further than 10% length forward of not further than 20% length position backward.
5. Car roof top container according to any of the preceding claims comprising vortex generators which are attached as separate elements or are integrated with said container.
6. Car roof top container according to any of the preceding embodiments comprising vortex generators which are at or below the maximum height of said container.
7. Car roof top container optionally according to any of the preceding embodiments comprising flow guidance elements for the supports.
8. Car roof top container according to embodiment 7 comprising flow guidance elements.
9. Car roof top container according to any of the preceding claims wherein the angle of the surface of the rear end is more than 20 degrees and in particular more than 25 degrees over at least 20% L.

In order to explain the invention further some definitions are introduced:

Camber: camber can refer to an airfoil section of the blade or to a fin of a vortex generator (vg). In the first case it is the maximum distance between the chord line of the airfoil and the camber line in percent of the chord. In the case of the vg fin it analogously refers to the maximum distance between the camber line and the fin chord line, where both lines are taken at 30% of the fin height above the blade surface and wherein the fin height is the maximum height of the fin above the blade surface.

Fin-chord: the chord of the fin of a vg at 10% of the fin height above the blade surface. The bottom-fin-chord is defined as the length over which the fin is connected to the base.

Edge-length of base: the total length of the contour of the projection of the base on the blade surface.

Distance between fins: the distance between fins refers to the distance between the highest fins or the main fins of a vortex generator pair.

Other embodiments according to the invention are the following:

That wherein the vortex generator exists of a separate base and separate fins which can be connected by a click-joint. For example, for the transportation of wind turbine blades it is beneficial when the fins can be installed after the blades are at the site.

That wherein the fin of a vortex generator pair has a trailing part which is loose from the base so that is flexes by the flow: at high-flow speeds this part could be aligned with the flow while at low-flow speeds it is inclined with the flow, by e.g. 10, degrees so that strong vortices are created. Also the inclination to the flow can be a function of temperature by using a bi-metal. This could be beneficial to delay stall at high temperatures and advance it at lower temperatures to compensate for air temperature dependence of stall power levels of stall controlled wind turbines.

That wherein the fins of vortex generator pairs are controlled automatically for example by magnetic actuators below the airfoil surface which control the position or orientation of the fins.

That wherein the cross section of a fin has a J-shape, where the lower part of the J is connected to the airfoil surface and the vertical part of the J is the protruding fin, so that the fin can be pushed against the airfoil surface by taking away the curvature of the J.

That wherein the fins of a vortex generator pair are essentially aligned with tangentials about the rotor axis, so that the angle of attack of the fins is close to zero in case of 2D-flow but increases with an increasing radial component in the flow which means that the angle of attack is low when the blade surface is clean and that the angle of attack increases with increasing surface contamination since the higher contamination leads a thicker boundary layer and thus to a larger radial component in the flow by the radial pressure gradient and the centrifugal force.

That wherein the vortex generator pair is applied to a wind turbine blade and the spacing between vortex generator pairs is larger than 10% c and in particular larger than 20% c and more in particular larger than 30% c, where the spacing is measured from the centre of a pair to the centre of an adjacent pair.

That wherein the vortex generator pair is made of a material essentially consisting of PVC or PVDF or aluminium. The fixation of the vortex generator pair to an airfoil of a plane can be done by welding, screws, pop-nails, double-sided adhesive tape.

That wherein the vortex generator pair comprises a base of which the lower side is concave so that it fits well to the convex suction side of the airfoil and in particular that the radius of curvature of the concave bottom side is less than the radius of curvature of the convex suction side.

That wherein the vortex generator base and double-sided adhesive are joint with a primer under controlled conditions.

DETAILED DESCRIPTION

Figure 1:
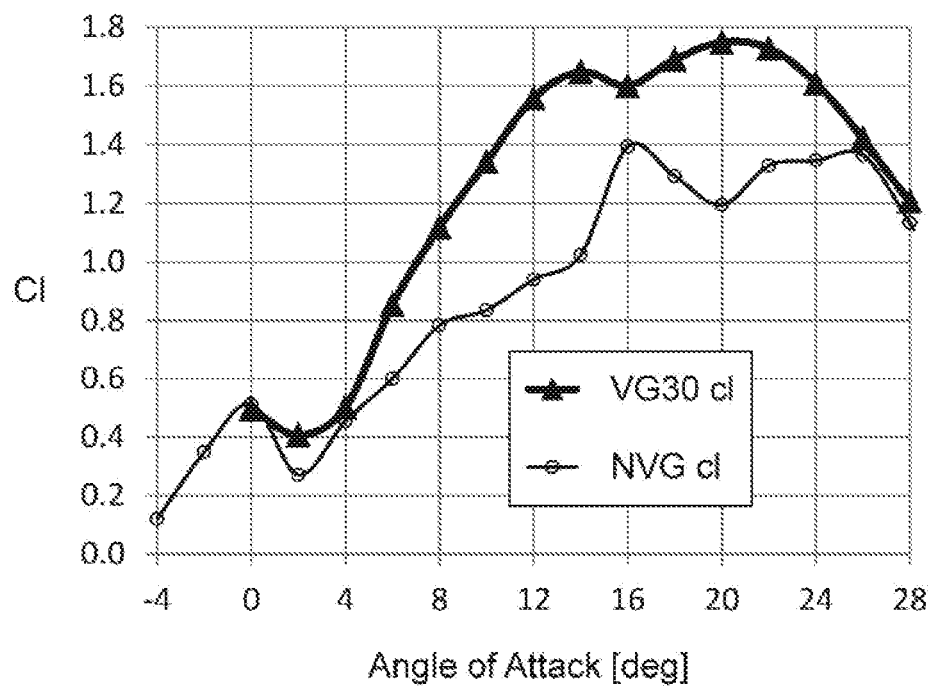
FIG. 1: Lift coefficient improvement by vortex generator.
Figure 2:
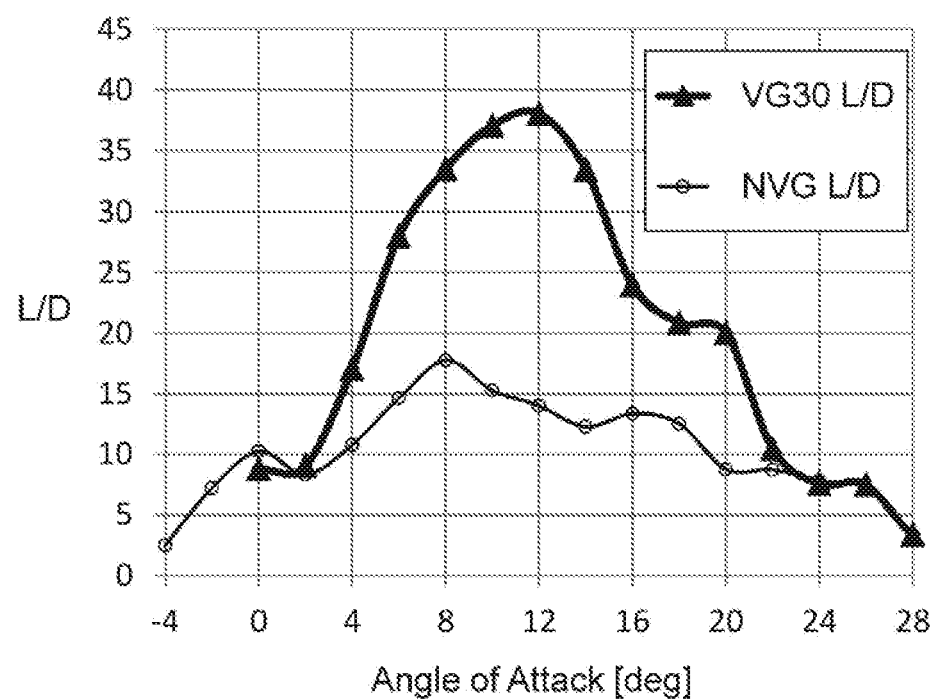
FIG. 2: Lift/drag ratio improvement by vortex generator.

FIG. 1 shows the lift coefficient $c_l$ as a function of the angle of attack of a 40% thick airfoil. It can be seen that the lift coefficient for the case with vortex generators installed at 30% c (label VG30 cl) is (much) higher in the range from 0 to 26 degrees compared to the result without vortex generators (label NVG cl). FIG. 2 shows the ratio of lift over drag for the same configuration. It can be seen that L/D is (much) better for the angle of attack range between 2 and 22 degrees. The results are obtained by CFD-simulation.

Figure 3:
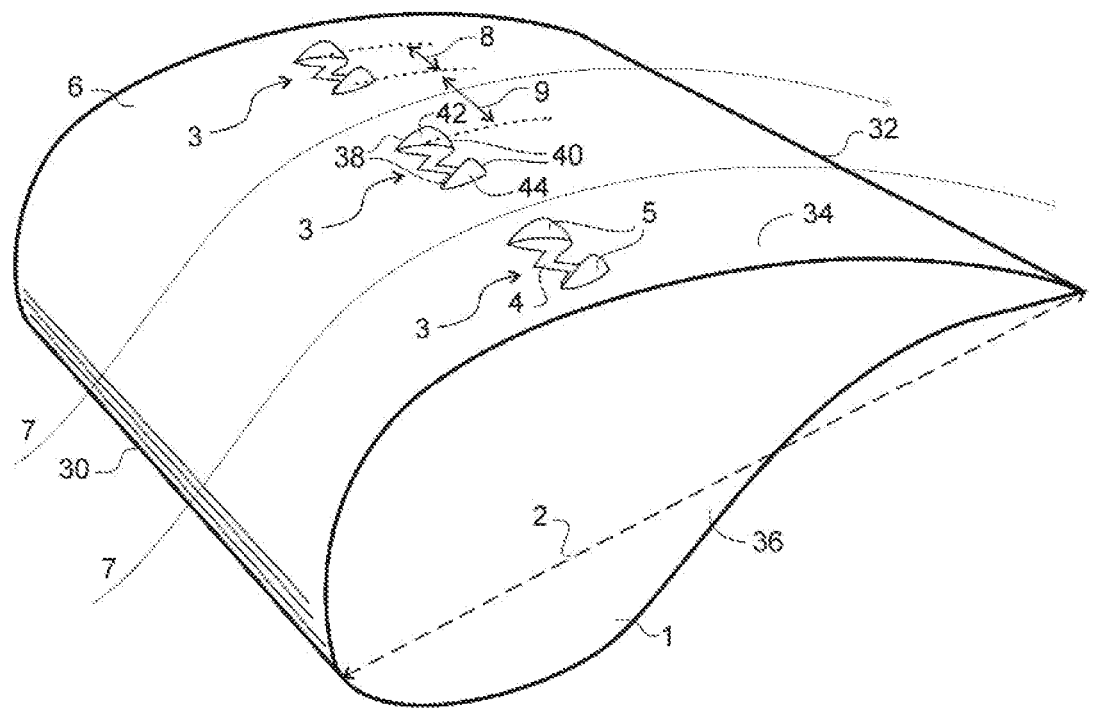
FIG. 3: Airfoil with 3 vortex generator pairs.

FIG. 3 shows an airfoil 1 with chord 2 and three vortex generator pairs 3 which are installed on the airfoil surface 6. The vortex generator pairs are shown on a larger scale than the airfoil for illustrative reasons. The airfoil 1 includes a leading edge 30, a trailing edge 32, and oppposing first and second surfaces 34, 36 extending between the edges 30, 32.

The vortex generator pairs 3 may be attached to the first surface 34. Each vortex generator pair has two fins 5 and a base 4 which are only labelled for one vortex generator pair, also labelled for one vortex generator pair in FIG. 3. The distance 8 between the pressure sides 42 of the fins of a vortex generator pair 3 is less than the distance 9 between the suction sides 44 of the adjacent fins of different vortex generator pairs.

Figure 4:
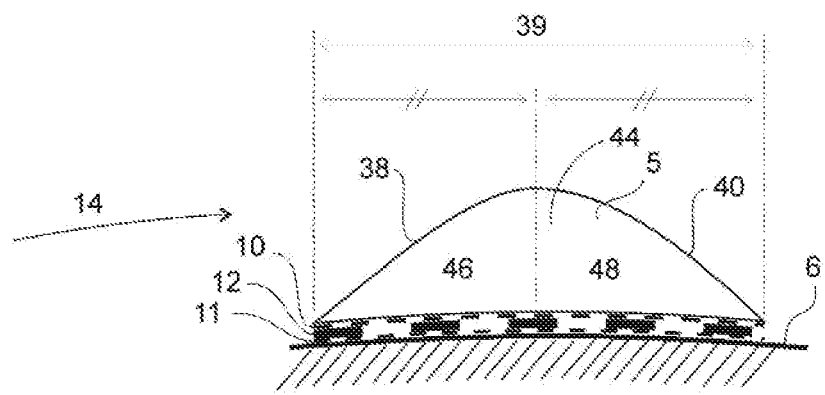
FIG. 4: Side view of a vortex generator pair.

FIG. 4 shows a side view of a vortex generator pair which is fixed by double-sided adhesive tape that has an adhesive layer 10 fixed to the base of the vortex generator pair and an adhesive layer 11 fixed to the airfoil surface 6 and a foam layer 12 in between. The thickness of layers 10, 11 and 12 are shown thicker than realistic for illustrative reasons. The fin chord 39 is taken at 10% of the fin height.

Each of the suction surfaces 44 has a leading half 46 and a trailing half 48 relative to the design inflow direction 14. The surface area of the trailing half 48 may be less than 200% of the surface area of the leading half 46 to provide a more symmetrical fin. In other embodiments, the surface area of the trailing half 48 may be less than 150% of the surface area of the lead half 46.

Figure 5A:
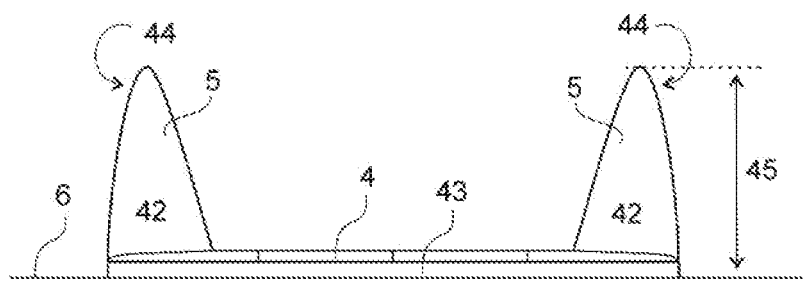
FIG. 5A: Front view of a vortex generator pair.
Figure 5B:
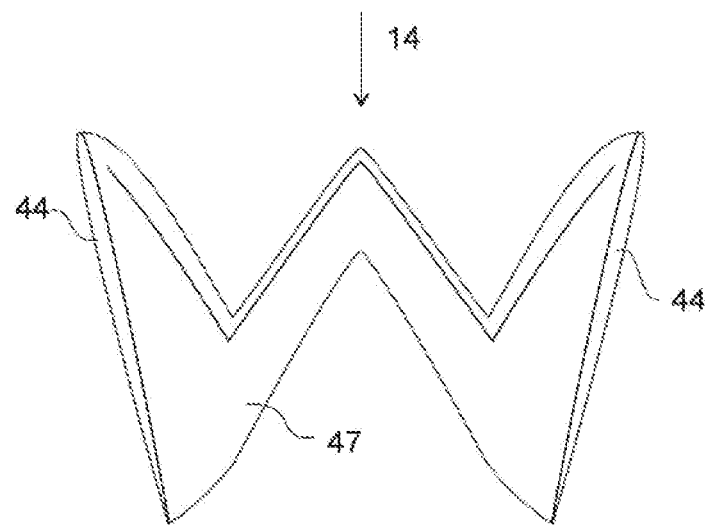
FIG. 5B: Top view of a vortex generator pair without cambered fins.
Figure 5C:
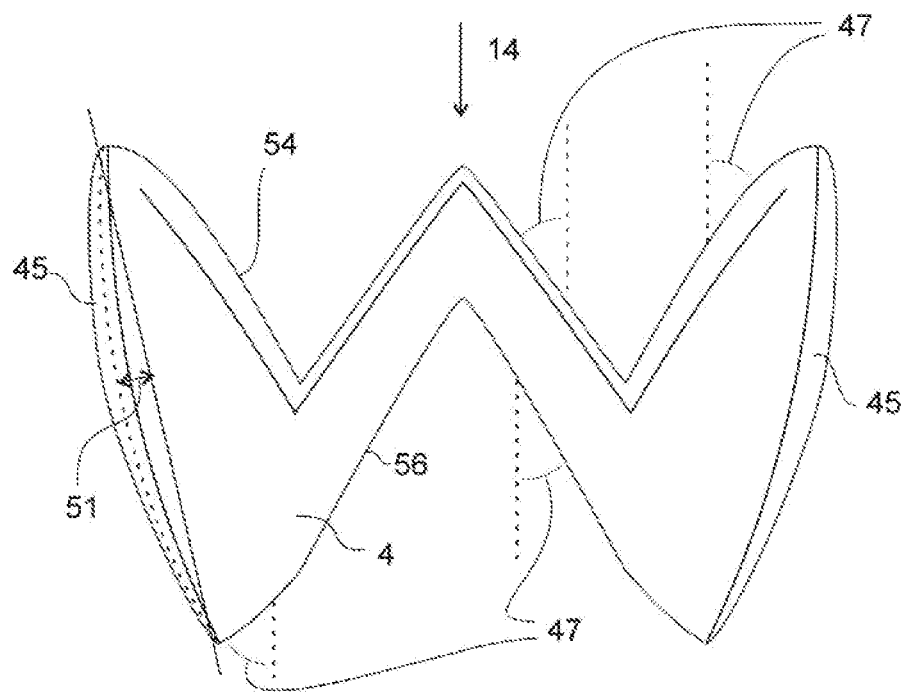
FIG. 5C: Top view of a vortex generator pair with cambered fins.

FIG. 5A shows a front view of a vortex generator looking at the pressure sides 42 of the fins 5. The height of the fins 45 is the maximum height above the blade surface 6 and includes the adhesive tape 43. In FIG. 5B a vortex generator pair with base 47 has fins 44 which are not cambered, however, the fins may be cambered in other embodiments as shown in FIG. 5C. Referring to FIG. 5C, the fins 45 have a camber 51 of at least 1% of the fin chord, or in other embodiments, at least 2% or 3% of the fin chord. The camber of the fins resulted in better aero dynamic performance and gave stiffness to the fins 45 at the same time. The fins 45 could be made very thin without becoming too flexible due to the camber. And thinner fins require less material. Furthermore, thanks to the camber of the fins, the baseplate 4 becomes flexible and can follow a range of curvatures of the airfoil surface where the vortex generator pair is attached. The base has leading edge 54 and trailing edge 56 which together form the edge length. The angle 47 is the angle between the design inflow direction 14 and the edge along the edge length.

Figure 6:
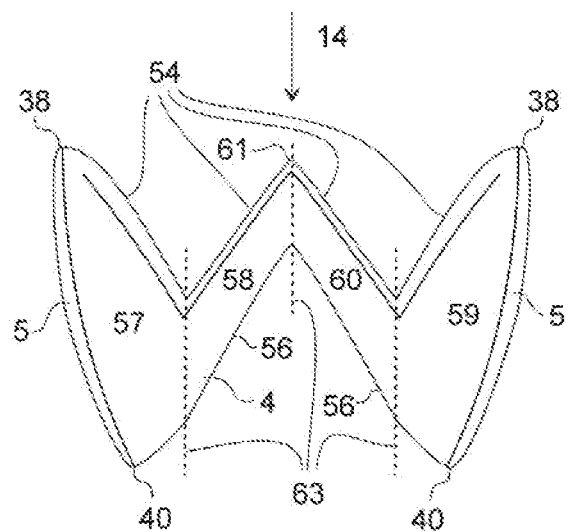
FIG. 6: Top view of a W-shaped vortex generator pair.

FIG. 6 shows a top view of a W-shaped vortex generator pair and the design inflow direction 14. The lateral direction is defined as perpendicular to the design inflow direction and in the base plane of the vortex generator pair. The base 4 may include a leading edge 54 and a trailing edge 56. The leading edge 54 includes multiple edges, that are interconnected to form a continuous edge extending between the leading edges 38 of the fins 5, also the trailing edge 56 includes multiple edges to form a continuous edge extending between the trailing edges 40 of the fins 5. In the W-shaped embodiment, the base has four surfaces, or segments such as surfaces 57, 58, 59, and surface 60. The surfaces 58 and 60 are interconnected at a vortex 61 and extend outwardly away from each other towards the trailing edge 56. This causes the surface 58 and 60 to extend towards the fins 5 and to be angled in a direction opposite to their corresponding fin. The surfaces 58 and 60 may be referred to as subfins.

Figure 7:
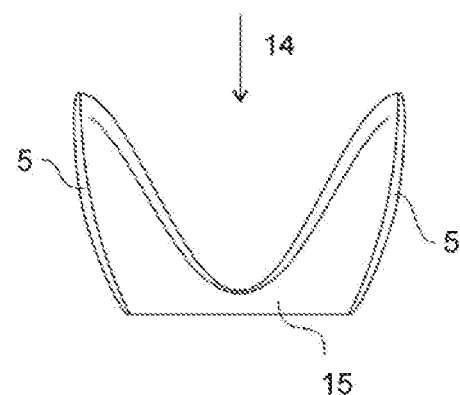
FIG. 7: Top view of a U-shaped vortex generator pair.
Figure 8:
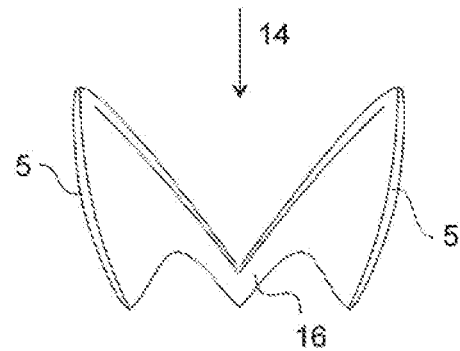
FIG. 8: Top view of a V-shaped vortex generator pair.
Figure 9:
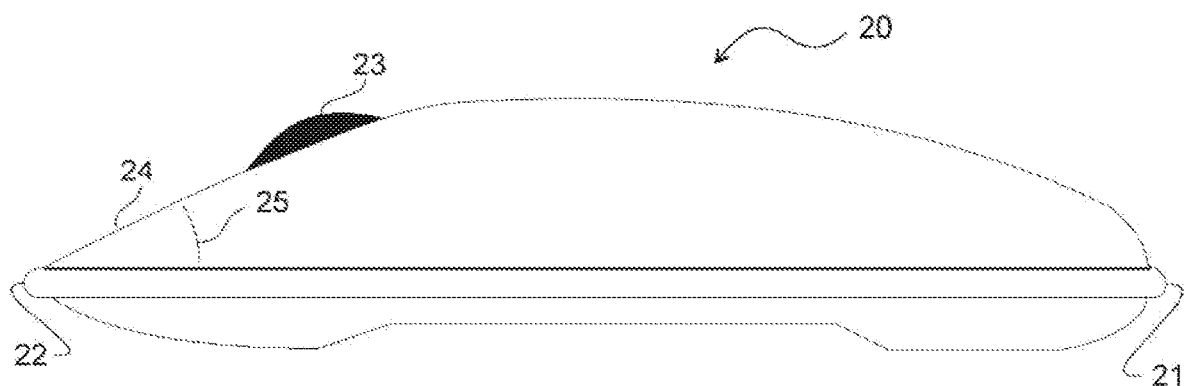
FIG. 9: Car roof top container.

FIG. 7 shows a top view of a U-shaped vortex generator pair. FIG. 8 shows a top view of a V-shaped vortex generator pair. FIG. 9 shows a car roof top container 20, with a length L between the front end 21 and a rear end 22, whereon a vortex generator fin 23 is installed. The upper surface of the trailing part of the container 24 has an angle 25 with the horizontal.

Although the illustrative embodiments of the present invention have been described in greater detail with reference to the accompanying drawings, it will be understood that the invention is not limited to those embodiments. Various changes or modifications may be effected by one skilled in the art without departing from the scope or the spirit of the invention as defined in the claims. Furthermore the validity of the claims is not dependent on the correctness of physical explanations.

It is to be understood that in the present application, the term "comprising" does not exclude other elements or steps. Also, each of the terms "a" and "an" does not exclude a plurality. Any reference sign(s) in the claims shall not be construed as limiting the scope of the claims.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wind turbine comprising:
    a blade having a leading edge, a trailing edge, and opposing first and second surfaces extending between the edges; and
    a vortex generator pair including:
    a base attached to the first surface such that the base is raised above the surface, wherein the base includes a leading edge and a trailing edge, and
    first and second spaced apart fins extending outwardly from opposing side portions of the base, wherein the first and second fins are positioned such that the first and second fins are not touching each other to define an air gap between the first and second fins and extending completely over the base, the base being a common base joining the first and second fins, the fins each have a leading edge, a trailing edge, a suction side and a pressure side, each of the suction sides having a trailing half and a leading half, wherein a surface area of the trailing half is less than 200 percent of a surface area of the leading half, wherein the spaced apart fins define an area in between and the base covers less than 90% of this area, and wherein the leading edge of the base includes multiple segments interconnected to form a continuous edge extending between the first and second fins, wherein the multiple segments are angled relative to each other at acute angles.

2. The wind turbine of claim 1, wherein the surface area of the trailing half is greater than the surface area of the leading half.

3. The wind turbine of claim 1, wherein the fins are angled relative to each other such that a distance between the leading edges of the fins is greater than a distance measured between the trailing edges of the fins.

4. The wind turbine of claim 1, wherein each of the fins are cambered inwardly by at least 1 percent of a chord of the fin.

5. The wind turbine of claim 1, wherein the vortex generator pair is located on the blade at a radial position that is located at a blade chord-wise position between 20 to 70 percent of a chord of the blade.

6. The wind turbine of claim 1, wherein the surface area of the trailing half is greater than the surface area of the leading half, and wherein the fins are angled relative to each other such that a distance between the leading edges of the fins is greater than a distance measured between the trailing edges of the fins.

7. The wind turbine of claim 1 further comprising a second vortex generator pair, having a same structure as the vortex generator pair, disposed on the first surface at a radially spaced position relative to the vortex generator pair.

8. The wind turbine of claim 7, wherein a distance between the vortex generator pair and the second vortex generator pair is greater than a width of the vortex generator pair measured between the fins.

9. The wind turbine of claim 1 further comprising a second vortex generator pair, having a same structure as the vortex generator pair, disposed on the first surface at a radially spaced position relative to the vortex generator pair.

10. The wind turbine of claim 9, wherein a distance between the vortex generator pair and the second vortex generator pair is greater than a width of the vortex generator pair measured between the fins.

11. A wind turbine comprising:
a blade having a leading edge, a trailing edge, and opposing first and second surfaces extending between the leading and trailing edges; and
a vortex generator pair including:
a base attached to the first surface and having opposing first and second edge portions, wherein the base includes a leading edge and a trailing edge, and
first and second spaced apart fins extending outwardly from the first and second edge portions, wherein the first and second fins are positioned such that the first and second fins are not touching each other to define an air gap between the first and second fins and extending completely over the base, the base being a common base joining the first and second fins, and wherein the leading edge of the base includes multiple edges interconnected to form a continuous edge extending between the first and second fins, wherein the multiple edges are angled relative to each other at acute angles.

12. The wind turbine of claim 11, wherein each of the first and second fins have a leading edge, a trailing edge, a suction side and a pressure side, each of the suction sides having a trailing half and a leading half, wherein a surface area of the trailing half is less than 200 percent of a surface area of the leading half.

13. The wind turbine of claim 11, wherein the spaced apart fins define an area in between and the base covers less than 90% of this area.

* * * * *